United States Patent
Mueller et al.

(10) Patent No.: US 11,980,324 B2
(45) Date of Patent: May 14, 2024

(54) PLACEABLE COOKTOP UTENSIL HAVING A HANDLE

(71) Applicant: Miele & Cie. KG, Guetersloh (DE)

(72) Inventors: Christoph Mueller, Roedinghausen (DE); Nils Marius Gehring, Bielefeld (DE); Niels Ohrmann, Guetersloh (DE); Daniel Ebke, Bielefeld (DE)

(73) Assignee: MIELE & CIE. KG, Guetersloh (DE)

( * ) Notice: Subject to any disclaimer, the term of this patent is extended or adjusted under 35 U.S.C. 154(b) by 720 days.

(21) Appl. No.: 17/062,669

(22) Filed: Oct. 5, 2020

(65) Prior Publication Data
US 2021/0100401 A1 Apr. 8, 2021
US 2022/0304517 A9 Sep. 29, 2022

(30) Foreign Application Priority Data

Oct. 7, 2019 (DE) ...................... 10 2019 126 830.3

(51) Int. Cl.
*A47J 45/06* (2006.01)

(52) U.S. Cl.
CPC ................... *A47J 45/068* (2013.01)

(58) Field of Classification Search
CPC ........ H05B 6/062; H05B 3/68; H05B 1/0266; H05B 2213/06; A47J 45/068; A47J 45/071; A47J 45/072; A47J 44/00; A47J 36/32; A47J 36/321
See application file for complete search history.

(56) References Cited

U.S. PATENT DOCUMENTS

| | | | |
|---|---|---|---|
| 2001/0032546 A1* | 10/2001 | Sharpe ................. | A47J 45/068 99/422 |
| 2018/0116457 A1* | 5/2018 | Mills ................... | H05B 6/1209 |
| 2019/0019515 A1 | 1/2019 | Kim et al. | |
| 2019/0387290 A1* | 12/2019 | Hedlund ................ | H04Q 9/00 |
| 2020/0059995 A1* | 2/2020 | Ohrmann ............... | H05B 6/44 |
| 2021/0012807 A1* | 1/2021 | Nashida ............... | G06F 3/0481 |

FOREIGN PATENT DOCUMENTS

| | | |
|---|---|---|
| DE | 20203566 U1 | 5/2002 |
| DE | 60132991 T2 | 3/2009 |
| DE | 202013007455 U1 | 9/2013 |
| DE | 102017111356 A1 | 11/2018 |
| EP | 3001771 A1 | 3/2016 |
| FR | 3033995 A1 | 9/2016 |
| WO | WO 2020197062 A1 | 10/2020 |

* cited by examiner

*Primary Examiner* — Dana Ross
*Assistant Examiner* — Kuangyue Chen
(74) *Attorney, Agent, or Firm* — LEYDIG, VOIT & MAYER, LTD.

(57) ABSTRACT

A placeable cooktop utensil includes: a handle for handling the placeable utensil; a controller; a transmitter unit for transmitting signals from the placeable utensil to the cooktop; and at least one input unit having at least one input area integrated in the handle for a user of the placeable utensil to input a user command, the transmitter unit and the at least one input unit being connected in signal communication with the controller, and the cooktop being controllable by the user command. The handle has a gripping portion for gripping and manually moving the placeable utensil and at least one input portion. The at least one input area is in the at least one input portion. At least one sensor for detecting the handle being approached and/or contacted by the user, is in the gripping portion.

11 Claims, 1 Drawing Sheet

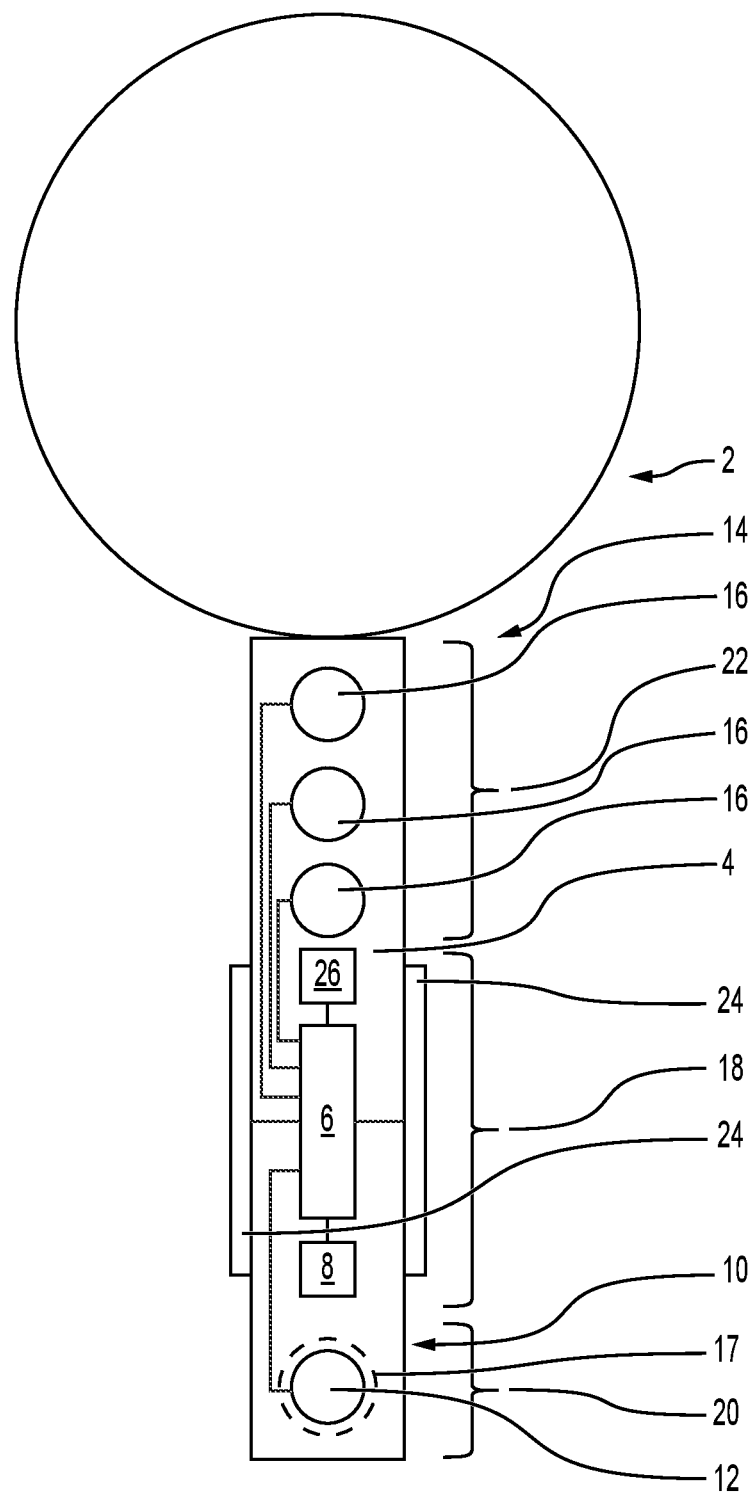

PLACEABLE COOKTOP UTENSIL HAVING A HANDLE

CROSS-REFERENCE TO PRIOR APPLICATION

Priority is claimed to German Patent Application No. DE 10 2019 126 830.3, filed on Oct. 7, 2019, the entire disclosure of which is hereby incorporated by reference herein.

FIELD

The present invention relates to a placeable cooktop utensil having a handle, of the type recited herein.

BACKGROUND

Such placeable cooktop utensils are previously known in a plurality of embodiments. The known placeable utensils include, for example, a handle for handling the utensil, a controller, a transmitter unit for transmitting signals from the placeable utensil to the cooktop, and at least one input unit having an input area integrated in the handle for a user of the placeable utensil to input a user command, the transmitter unit and the input unit being connected in signal communication with the controller, and the cooktop being controllable by the user command.

Pans and pots in the form of placeable utensils are also known, which, together with a cooktop in the form of an induction cooktop, form a system. Thus, the European Patent EP 3 001 771 B1 provides a method for detecting the identity of a pot on a cooking zone of a cooktop. The cooktop has a pot sensor means whose purpose is to detect the presence of a pot on the cooking zone. The pot has a temperature sensor and a transmitter; it being the case that the transmitter is supposed to transmit at least two data sets to a receiver of a cooktop controller. The first data set is supposed to represent an identification device for an individual pot, while the second data set is supposed to relate to the temperature condition of the pot measured by the temperature sensor. When the pot sensor means detects the presence of any particular pot, a heating element of the cooktop is supposed to be activated by a power profile template to effect a temperature change in the pot placed on the cooking zone. The thermal capacity of the pot causes the temperature change to always be delayed relative to the power profile template. On the basis of the temperature information returned to the cooktop controller, it is then supposed to be determined whether the temperature profile detected by the temperature sensor on the pot corresponds to the template of the power profile generated by the heating element. If the temperature profile and the power profile template mutually correspond, the pot having the pot identification device is supposed to be recognized as having been placed on this cooking zone.

SUMMARY

In an embodiment, the present invention provides a placeable cooktop utensil, comprising: a handle for handling the placeable utensil; a controller; a transmitter unit configured to transmit signals from the placeable utensil to the cooktop; and at least one input unit having at least one input area integrated in the handle for a user of the placeable utensil to input a user command, the transmitter unit and the at least one input unit being connected in signal communication with the controller, and the cooktop being controllable by the user command, wherein the handle has a gripping portion for gripping and manually moving the placeable utensil and at least one input portion, wherein the at least one input area is configured in the at least one input portion, and wherein at least one sensor configured to detect the handle being approached and/or contacted by the user, is configured in the gripping portion.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows an exemplary embodiment of the placeable utensil according to the present invention in a plan view.

DETAILED DESCRIPTION

In an embodiment, the present invention provides a cooktop utensil where an improper handling is effectively prevented, however, at least minimized.

In an embodiment, the present invention provides a placeable utensil having the features described herein, which is characterized in that the handle has a gripping portion for gripping for the purpose of manually moving the placeable utensil and has at least one input portion, the input area being configured in the input portion, and at least one sensor for detecting the user approaching and/or contacting the handle, being configured in the gripping portion. Advantageous embodiments and refinements of the present invention will become apparent from the following description.

The advantage provided by the present invention is, in particular that an improper handling of the placeable utensil is effectively prevented, however, at least minimized. This also significantly enhances safety when controlling the operation of the placeable utensil and, in particular substantially enhances safety when controlling the operation of the cooktop, without thereby reducing the ease of use for the user of the placeable utensil. On the one hand, the clear spatial separation of the handle into a gripping portion and the at least one input portion effectively counteracts any unintentional control action on the at least one input portion of the at least one input unit upon gripping of the handle to manually move the placeable utensil. On the other hand, by providing at least one sensor at least in the gripping portion to detect the user approaching and/or contacting the handle, it is possible to automatically detect a gripping intention by the user of the placeable utensil for the purpose of manually moving the same. Thus, in the case of the placeable utensil according to the present invention, it is made possible to distinguish between a control action on the handle for the purpose of inputting a user command, on the one hand, and a control action on the handle for the purpose of manually moving the placeable utensil, on the other hand.

Within suitable broad limits, the placeable utensil is freely selectable in terms of type, function, dimensions and material. As explained above, the placeable utensil may be in the form of a pan or a pot. Also conceivable, however, are other specific embodiments, such as kettles, roasters or the like. Depending on the specific embodiment of the placeable utensil, it may have one or a plurality of handles, it being possible for the inventive design of the handle to be provided for merely one of the handles or for a plurality thereof. The at least one input area may be in the form of a touch-sensitive area of the handle, for example. In other specific embodiments, the at least one input area may also be in the form of a proximity-sensitive area. The at least one input area may thereby be configured on the handle to be visible or invisible from the outside. For example, the at least one input area may be fully integrated in the handle, so that it is neither visible nor perceptible from the outside. The placeable utensil may be suitably designed for an inductive cooktop. However, this is not absolutely necessary. The placeable utensil according to the present invention may be suitably designed for all conceivable types of cooktops.

As a general principle, the further processing of the detection of the handle being approached and/or contacted by the user, thus the method for processing the detection of the handle being approached and/or contacted by the user, may be freely selected within suitable broad limits. This applies similarly to the corresponding embodiment of the placeable utensil according to the present invention.

An advantageous refinement of the placeable utensil according to the present invention provides that at least one of the at least one sensor be configured in the gripping portion and be designed for detecting a human hand gripping the handle in the gripping portion; as a function of this sensor detecting this gripping, the inputting of the user command being blockable by the controller. The placeable utensil according to the present invention is hereby realized in a structurally simple manner.

Accordingly, an advantageous refinement of the method provides that at least one of the at least one sensor be configured in the gripping portion and be designed for detecting a human hand gripping the handle in the gripping portion; as a function of this sensor detecting this gripping, the inputting of the user command being blocked by the controller.

An advantageous refinement of the placeable utensil according to the present invention provides that at least one of the at least one sensor be designed as a touch sensor; with the exception of the input area, the touch sensor being configured at least in the input portion, and, as a function of this touch sensor detecting a human hand contacting the input portion of the handle, the inputting of the user command being blockable by the controller. This further enhances the protection against an improper handling of the placeable utensil. The touch sensor may be in the form of a capacitive sensor, for example.

Accordingly, an advantageous refinement of the method provides that at least one of the at least one sensor be in the form of a touch sensor; with the exception of the input area, the touch sensor being configured at least in the input portion, and, as a function of this touch sensor detecting a human hand contacting the input portion of the handle, the inputting of the user command being blocked by the controller.

An advantageous refinement of the placeable utensil according to the present invention provides that at least one of the at least one sensor be designed as a proximity sensor; with the exception of the input area, the proximity sensor being configured at least in the input portion, and, as a function of this proximity sensor detecting a human hand approaching the input portion of the handle, the inputting of the user command being blockable by the controller. This makes possible a desired blocking of the inputting of the user command, even before the handle is actually contacted by the user, thereby reducing the reaction time. The proximity sensor may be in the form of an ultrasonic sensor or infrared light sensor, for example.

Accordingly, an advantageous refinement of the method provides that at least one of the at least one sensor be in the form of a proximity sensor; with the exception of the input area, the proximity sensor being configured at least in the input portion, and, as a function of this proximity sensor detecting a human hand approaching the input portion of the handle, the controller blocking the inputting of the user command.

Another advantageous refinement of the placeable utensil according to the present invention provides that at least one of the at least one sensor be in the form of a proximity sensor, the proximity sensor being configured at least in the gripping portion, and, as a function of this proximity sensor detecting a human hand approaching the gripping portion of the handle, the controller being able to switch on a display unit of the placeable utensil and/or of the cooktop. This makes it possible for the user to be informed already at an early stage about the state of the placeable utensil and/or of the cooktop, without having to undertake further operating steps.

Accordingly, an advantageous refinement of the method provides that at least one of the at least one sensor be in the form of a proximity sensor; the proximity sensor being configured at least in the gripping portion, and, as a function of this proximity sensor detecting a human hand approaching the gripping portion of the handle, the controller being able to be switch on a display unit of the placeable utensil and/or of the cooktop.

An especially advantageous refined embodiment of the placeable utensil according to the present invention provides that the controller of the placeable utensil and/or a cooktop controller be transferable from a standby mode to a ready mode or an operating mode as a function of the sensor detecting the handle being approached and/or contacted; in the standby mode, the controller and/or the cooktop controller being configured essentially merely for transfer to the ready mode or the operating mode; in the ready mode, for implementing an association of the placeable utensil with a cooking zone of the cooktop and, in the operating mode, for operating the placeable utensil and/or the cooktop in the full functionality thereof. On the one hand, this makes possible an energy-efficient operation of the placeable utensil and/or of the cooktop. On the other hand, the ease of use is thereby further enhanced, at the same time ensuring safety when controlling the operation of the placeable utensil and the cooktop.

Accordingly, an especially advantageous refinement of the method provides that the controller of the placeable utensil and/or a cooktop controller be transferred from a standby mode to a ready mode or an operating mode as a function of the sensor detecting the handle being approached and/or contacted; in the standby mode, the controller and/or the cooktop controller being designed essentially merely for transfer to the ready mode or the operating mode; in the ready mode, for implementing an association of the placeable utensil with a cooking zone of the cooktop, and, in the operating mode, for operating the placeable utensil and/or the cooktop in the full functionality thereof.

Another advantageous refinement of the cooktop utensil according to the present invention provides that the controller be able to switch on the cooktop as a function of detection of the handle being approached and/or contacted. In this manner, the ease of use is additionally enhanced, at the same time ensuring safety when controlling the operation of the placeable utensil and the cooktop.

Accordingly, an advantageous refinement of the method provides that the controller switch on the cooktop as a function of the detection of the handle being approached and/or contacted.

Another advantageous refinement of the placeable utensil according to the present invention provides that at least one of the at least one sensor be designed for detecting a rotation of the human hand relative to the handle, as a function of the rotation being detected, a user command being inputtable by the user. This makes it possible for the at least one sensor to be simultaneously used for the user to intuitively input a user command. This enhances the functionality of the at least one sensor. This inputting of a user command may thereby take place in addition or alternatively to the inputting of a user command via the at least one input area.

Accordingly, an advantageous refinement of the method provides that at least one of the at least one sensor be designed for detecting a rotation of a human hand relative to the handle, as a function of the detection of the rotation, a user command being input by the user.

An especially advantageous refined embodiment of the placeable utensil according to the present invention provides that the placeable utensil have a motion sensor that is connected in signal communication with the controller for detecting a manual movement of the placeable utensil; a power setting of the cooktop being automatically reducible by the controller as a function of the detection of the handle being approached and/or contacted and of the detection of the manual movement of the placeable utensil. This makes it possible to effectively prevent or at least reduce, for example, an impairment of or damage to components of the placeable utensil and/or of the cooktop that are sensitive to mechanical stresses. This holds, in particular for an IBGT, thus a bipolar transistor having an insulated gate electrode, which is installed in a resonant circuit of an inductive cooktop. The motion sensor may be in the form of an acceleration sensor, a gyro sensor, and/or a vibration sensor, for example.

Accordingly, an advantageous refinement of the method provides that the placeable utensil have a motion sensor that is connected in signal communication with the controller for detecting a manual movement of the placeable utensil, a power setting of the cooktop being automatically reduced by the controller as a function of the detection of the handle being approached and/or contacted and of the detection of the manual movement of the placeable utensil.

Another advantageous refinement of the placeable utensil according to the present invention provides that a first input portion having at least one first input area and a second input portion having at least one second input area be configured in the handle; the gripping portion being configured on the handle between the first and the second input portion. This makes it possible to spatially separate dissimilar input areas in a structurally simple manner. This is useful, for example, when a control action on the first input area is not necessarily followed by a control action on the second input area. Thus, a first input area designed as an on-off switch for the placeable utensil could be effectively separated from second input areas designed as power-level adjusting elements for the cooktop.

FIG. 1 exemplarily shows a placeable cooktop utensil. Placeable utensil 2 is in the form of a pan for an inductive cooktop and includes a handle 4 for handling placeable utensil 2, a controller 6, a transmitter unit 8 for transmitting signals from placeable utensil 2 to the cooktop, and a first input unit 10 having a first input area 12 integrated in handle 4 for a user of placeable utensil 2 to input a first user command, as well as a second input unit 14 having three second input areas 16 integrated in handle 4 for the user of placeable utensil 2 to input a second user command, transmitter unit 8 and input units 10, 14 being connected in signal communication with controller 6. First input unit 10 having first input area 12 is used for switching the placeable utensil on and off. Second input unit 14 having second input areas 16 is used for adjusting the power setting in the case of a cooking zone of the cooktop upon which placeable utensil 2 has previously been placed. Accordingly, a cooktop controller is controllable by the second user command. Input units 10, 14, along with input areas 12, 16 thereof, are fully integrated in handle 4. To facilitate identification, first input area 12 of first input unit 10 is configured in a depression of handle 4, which is symbolized in FIG. 1 by a dashed line 17. Once first user command has switched on placeable utensil 2, second input areas 16 are backlit, indicating the respective selectable temperatures for the above mentioned cooking zone of the cooktop, so that second input areas 16 may likewise each be readily identified for the purpose of inputting the second user command. Input areas 12, 16 are each in the form of what are commonly known as touch buttons, thus touch-sensitive buttons. Input areas 12, 16, thus the touch buttons, may thereby be disposed under a plastic or glass cover.

In addition, handle 4 has a gripping portion 18 for gripping for the purpose of manually moving placeable utensil 2, and has a first input portion 20 and a second input portion 22, first input area 12 being configured in first input portion 20 and second input areas 16 in second input portion 22. As is readily apparent from FIG. 1, gripping portion 18 is configured on handle 4 between first input portion 20 and second input portion 22. At least one sensor 24 is disposed in gripping portion 18 for detecting the user approaching and/or contacting the handle, it being possible for the at least one sensor 24 to be in the form of a plurality of further touch buttons, for example. In the present exemplary embodiment, sensors 24 are disposed along two opposite longitudinal sides of handle 4, respectively. See FIG. 1. Sensors 24 are designed for detecting a human hand gripping handle 4 in gripping portion 18; controller 6 being able to block the inputting of the first and second user command as a function of sensors 24 detecting this gripping. Accordingly, controller 6 automatically blocks the inputting of the first and second user command if sensors 24 have detected a human hand gripping handle 4 in gripping portion 18, namely the hand of the user of placeable utensil 2. This ensures that an unwanted improper handling of placeable utensil 2 is effectively prevented in the case of a manual movement of placeable utensil 2, namely an unwanted improper handling of first or second input areas 12, 16.

It is also conceivable that at least one of the at least one sensor be in the form of a touch sensor; with the exception of the first and/or second input area, the touch sensor being configured at least in the first and/or second input portion, and the controller being able to block the inputting of the first and/or second user command as a function of this touch sensor detecting a human hand contacting the first and/or second input portion of the handle. Accordingly, the controller automatically blocks the inputting of the first and/or second user command if this touch sensor has detected a human hand contacting the first and/or second input portion of the handle.

It is also possible that at least one of the at least one sensor is in the form of a proximity sensor; with the exception of the first and/or second input area, the proximity sensor being configured at least in the first and/or second input portion, and the controller being able to block the inputting of the first and/or second user command as a function of this proximity sensor detecting a human hand approaching the first and/or second input portion of the handle. Accordingly, the controller automatically blocks the inputting of the first and/or second user command if this proximity sensor has detected a human hand approaching the first and/or second input portion of the handle.

It is also conceivable that at least one of the at least one sensor be in the form of a proximity sensor, the proximity sensor being configured at least in the gripping portion, and, the controller being able to switch on a display unit of the placeable utensil and/or of the cooktop as a function of this proximity sensor detecting a human hand approaching the gripping portion of the handle. Accordingly, the controller automatically switches on a display unit of the placeable utensil and/or of the cooktop if this proximity sensor has detected a human hand approaching the gripping portion of the handle. For example, in accordance with the present exemplary embodiment, it could be provided that the above-mentioned backlighting of second input areas 16 be able to be switched on or switched on automatically in the manner explained.

To make possible a most energy-efficient possible operation of the placeable utensil according to the present invention and of the cooktop, it may be provided that the controller of the placeable utensil and/or a cooktop controller be transferable from a standby mode to a ready mode or an operating mode as a function of the sensor detecting the handle being approached and/or contacted, the controller and/or the cooktop controller being designed in the standby mode, essentially merely for transfer to the ready mode or the operating mode; in the ready mode, for implementing an association of the placeable utensil with a cooking zone of the cooktop and, in the operating mode, for operating the placeable utensil and/or the cooktop in the full functionality thereof. Accordingly, the controller of the placeable utensil and/or a cooktop controller are/is transferred from a standby mode to a ready mode or an operating mode if the sensor has detected the handle being approached and/or contacted. For example, it is possible that the cooktop is able to be switched on, respectively is switched on by the controller as a function of the detection of the handle being approached and/or contacted.

Besides detecting the user approaching and/or contacting the handle, the at least one sensor may also be used for at least one further function. For example, it is conceivable that at least one of the at least one sensor is designed for detecting a rotation of a human hand relative to the handle; a user command being inputtable by the user as a function of the detection of the rotation. In the present exemplary embodiment, for example, the second user command could be input via the aforementioned rotation alternatively or additionally to via second input unit 14 having second input areas 16. Thus, by rotating his/her hand about the longitudinal axis of handle 4, the user would be able to raise or lower the power level for this cooking zone, depending on the direction of rotation, for the purpose of adjusting the power level for the cooking zone of the cooktop upon which the placeable utensil has been placed.

In addition to the at least one sensor, it may be provided that the placeable utensil have a motion sensor 26 that is connected in signal communication with the controller for detecting a manual movement of the placeable utensil; a power setting of the cooktop being automatically reducible by the controller as a function of the detection of the handle being approached and/or contacted and of the detection of the manual movement of the placeable utensil. This makes it possible to effectively protect sensitive components of the cooktop which could be impaired or damaged in the function thereof due to a mechanical stress occurring in response to a user manually moving the placeable utensil.

Thus, in the aforementioned variants, the inventive placeable utensil in accordance with the present exemplary embodiment effectively prevents an improper handling of the placeable utensil 2; at least, however, the possibility of an improper handling is thereby appreciably minimized. Thus, safety is also significantly enhanced when controlling the operation of placeable utensil 2 and, in particular when controlling the operation of the cooktop, without thereby reducing the ease of use for the user of placeable utensil 2. On the one hand, the clear spatial separation of handle 4 into a gripping portion 18 and the at least one input portion 20, 22 effectively counteracts any unintentional control action on the at least one input portion 12, 16 of the at least one input unit 10, 14 when handle 4 is gripped to manually move placeable utensil 2. On the other hand, a gripping intention by the user of placeable utensil 2 for the purpose of manually moving the same may be automatically detected by the provision of the at least one sensor 24 in gripping portion 18 to detect the user approaching and/or contacting handle 4. Thus, in the case of placeable utensil 2, it is made possible to distinguish between a control action on handle 4 for the purpose of inputting a user command, on the one hand, and a control action on handle 4 for the purpose of manually moving placeable utensil 2, on the other hand.

However, the placeable utensil according to the present invention is not limited to the exemplary embodiment described above.

The placeable utensil may also be in the form of a pot. Also conceivable, however, are other specific embodiments, such as kettles, roasters or the like. Depending on the specific embodiment of the placeable utensil, it may have one or a plurality of handles, it being possible for the inventive design of the handle to be provided for merely one of the handles or for a plurality thereof. The at least one input area may be in the form of a touch-sensitive area of the handle, for example. In other specific embodiments, the at least one input area may also be in the form of a proximity-sensitive area. The at least one input area may thereby be configured on the handle to be visible or invisible from the outside. For example, the at least one input area may be fully integrated in the handle, so that it is neither visible nor perceptible from the outside. The placeable utensil may be suitably designed for an inductive cooktop. However, this is not absolutely necessary. The placeable utensil according to the present invention may be suitably designed for all conceivable types of cooktops.

The at least one sensor may be freely selected within broad suitable limits in terms of type, function, dimensions, material, number and configuration. Thus, the above explanations are merely to be understood as being exemplary and not limiting. Depending on the particular application, one skilled in the art will appropriately select the at least one sensor and combine dissimilar sensor technologies, for example.

In addition to the transmitting unit, the placeable utensil according to the present invention may also have a receiving unit for the purpose of transmitting signals from the cooktop to the placeable utensil. It is also conceivable that the transmitting unit of the placeable utensil according to the present invention be in the form of a combined transmitting/receiving unit.

Instead of the above described configuration of the gripping portion and of the two input portions according to the present exemplary embodiment, it is also conceivable that the handle have only one single input portion or more than two input portions. Also possible is a configuration of the gripping portion that deviates relative to the at least one input portion.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A placeable cooktop utensil, comprising:
    a handle for handling the placeable cooktop utensil;
    a controller;
    a transmitter unit configured to transmit signals from the placeable cooktop utensil to a cooktop; and
    at least one input unit having at least one input area integrated in the handle for a user of the placeable cooktop utensil to input a user command, the transmitter unit and the at least one input unit being connected in signal communication with the controller, and the cooktop being controllable by the user command,
    wherein the handle has a gripping portion for gripping and manually moving the placeable cooktop utensil and at least one input portion,
    wherein the at least one input area is in the at least one input portion,
    wherein at least one sensor configured to detect the handle being approached and/or contacted by the user, is in the gripping portion,
    wherein at least one of the at least one sensor is configured to detect a human hand gripping the handle in the gripping portion, and
    wherein the controller is configured to block an inputting of the user command as a function of the at least one of the at least one sensor detecting the gripping.

2. The placeable cooktop utensil as recited in claim 1, wherein at least one of the at least one sensor comprises a touch sensor.

3. The placeable cooktop utensil as recited in claim 1, wherein at least one of the at least one sensor comprises a proximity sensor, and
    wherein the proximity sensor is configured at least in the gripping portion.

4. The placeable cooktop utensil as recited in claim 1, wherein at least one of the at least one sensor comprises a proximity sensor, and
    wherein with exception of the at least one input area, the proximity sensor is configured at least in the at least one input portion.

5. The placeable cooktop utensil as recited in claim 1, wherein the controller of the placeable cooktop utensil and/or a cooktop controller are/is transferable from a standby mode to a ready mode or an operating mode as a function of the sensor detecting the handle being approached and/or contacted,
    wherein the controller and/or the cooktop controller is/are configured in the standby mode essentially merely to transfer to the ready mode or the operating mode, and
    wherein the controller and/or the cooktop controller is/are configured in the ready mode to implement an association of the placeable cooktop utensil with a cooking zone of the cooktop, and in the operating mode, to operate the placeable cooktop utensil and/or the cooktop in a full functionality thereof.

6. The placeable cooktop utensil as recited in claim 4, wherein as a function of the proximity sensor detecting a human hand approaching and/or contacting the at least one input portion of the handle, the controller is configured to block inputting of the user command.

7. The placeable cooktop utensil as recited in claim 1, wherein the cooktop is configured to be switched on by the controller as a function of a detection of the handle being approached and/or contacted.

8. The placeable cooktop utensil as recited in claim 1, wherein at least one of the at least one sensor is configured to detect a rotation of a human hand relative to the handle, a user command being inputtable by the user as a function of detection of the rotation.

9. The placeable cooktop utensil as recited in claim 1, wherein the placeable cooktop utensil has a motion sensor that is connected in signal communication with the controller for detection of a manual movement of the placeable cooktop utensil.

10. The placeable cooktop utensil as recited in claim 1, wherein a power setting of the cooktop is automatically reducible by the controller as a function of a detection of the handle being approached and/or contacted and of a detection of a manual movement of the placeable cooktop utensil.

11. The placeable cooktop utensil as recited in claim 1, wherein a first input portion having at least one first input area and a second input portion having at least one second input area are configured in the handle, the gripping portion being configured on the handle between the first input portion and the second input portion.

* * * * *